United States Patent [19]

Modisette et al.

[11] Patent Number: 4,778,985
[45] Date of Patent: Oct. 18, 1988

[54] IMAGING PLATE STRUCTURE

[75] Inventors: J. Everett Modisette; Kenneth L. Lawley, both of San Antonio, Tex.

[73] Assignee: Texas Medical Instruments, Inc., Schertz, Tex.

[21] Appl. No.: 95,884

[22] Filed: Sep. 14, 1987

[51] Int. Cl.[4] ............................................. H01J 31/50
[52] U.S. Cl. ............................. 250/213 R; 250/327.2; 313/386; 365/112
[58] Field of Search ............ 250/213 R, 370 G, 327.2; 313/386, 366, 507

[56] References Cited

U.S. PATENT DOCUMENTS 3,961,314  6/1976  Klose et al. ..................... 250/213 R
4,176,275 11/1979  Korn et al. ...................... 250/213 R
4,521,808  6/1985  Ong et al. ........................... 358/111

OTHER PUBLICATIONS

IBM Technical Disclosure Bulletin, Oct. 1966, vol. 5, No. 5, pp. 555-556, W. R. Beam.
F. A. Schwertz, "Xerographic Selenium Photoreceptors", 1965, pp. 121-134.
J. W. Boag, "Xeroradiography", Phys. Med. Biol., 1973, vol. 18, No. 1, pp. 3-37.
P. Ehrlich, "Photoconductive Polymers", pp. 338-364, date unknown.

Primary Examiner—Edward P. Westin
Assistant Examiner—Khaled Shami
Attorney, Agent, or Firm—Dula, Shields & Egbert

[57] ABSTRACT

An imaging plate structure having a first conductive layer, a first insulative layer, a photoconductive layer, a second insulative layer, and a second conductive layer. The first insulative layer is integrally affixed to the side of the first conductive layer. The photoconductive layer is integrally affixed to the other side of the first insulative layer. The second insulative layer is integrally affixed to the other side of the photoconductive layer. The second conductive layer is integrally affixed to the other side of the second insulative layer. Both the first and the second insulative layers have a thickness suitable for preventing charge tunnelling therethrough. These first and second insulative layers are made of a true insulator material. The photoconductive layer is comprised of a photoconductor that is responsive to radiation of known energy. The first conductive layer and the first insulative layer are transmissive with respect to the radiation acting on the imaging plate. First and second electrical connections are electrically connected to the first and second conductive layers.

24 Claims, 6 Drawing Sheets

IMAGING PLATE STRUCTURE

FIELD OF THE INVENTION

The present invention relates to apparatus used to obtain radiographic information. More particularly, the present invention relates to an imaging plate configuration used to provide an electrostatic charge image in accordance with the varying amount of incident electromagnetic radiation received by the plate structure.

BACKGROUND ART

The extensive development and improvement of xerographic methods of phtocopying documents has led, in recent years, to renewed attempts to exploit the special properties of this process for both industrial and medical radiography. Early attempts to introduce the method were unsuccessful, principally because the sensitivity of the selenium plates was then too low to compete with film but also because the associated apparatus was not sufficiently convenient or reliable in every day use. Additionally, the commercial return was judged unattractive by the manufacturers.

In xeroradiography the detecting medium is a thin film of a photoconductor; a substance, that is, which normally contains very few charge carriers but in which radiation can liberate new carriers with a lifetime long enough to enhance greatly the natural conductivity. The surface of the photoconducting layer is first given a uniform surface charge, usually laid down by a corona charging device, and has been enclosed in a light-tight cassette and exposed to the radiation penetrating through the irradiated object. The original uniform charge is partly dissipated by the current thus induced in the photoconducting layer and the residual charge pattern on the object forms a "latent image" of the radiation. This charge pattern must then be made visible by some appropriate method of development. There are many ways of doing this, but the method usually employed in radiographic work is to expose the electrostatic "latent image" to an aerosol of electrically charged powder particles. These adhere to the surface principally in the regions of high field strength and thus delineate clearly any sharp steps or steep gradients in the charged density.

The conductivity induced in selenium by visible light has been studied very extensively. Very little conductivity is produced in vitreous selenium by light of wavelengths longer than 5,500 angstroms. The absorption coefficient and the induced conductivity both rise rapidly as the wavelength is reduced, and below 4,000 angstroms the quantum yield (carrier pairs per photon absorbed) reaches unity at high field strengths. It cannot rise above unity sine a single quantum of light in the visible or near ultraviolet can produce, at most, one pair of carriers. Blue light is strongly absorbed and the photons cannot penetrate beyond a very thin "photon absorption layer", within which all the charge carriers, positive holes and negative electrons, are formed. It was only until a few years ago that the observed strong dependence of conductivity upon field strength in the selenium could be explained very satisfactorily by two processes: recombination of positive and negative charge carriers within the photon absorption layer (where both kinds are present) and trapping of those carriers which escaped from the photon absorption layer as they were driven through the bulk of the selenium under the influence of the field.

U.S. Pat. No. 4,521,808, issued on June 4, 1985 to the University of Texas System, describes an electrostatic imaging apparatus having a plate structure sequentially arranged as follows: electrode, insulator, photoconductive layer, diode layer, and electrode. In this invention, the diode layer of aluminum oxide that acts as a blocking contact between the electrode layer and the photoconductive layer. This very thin aluminum oxide layer acts as a blocking contact to retain the positive charge on the surface of the selenium. In this configuration, the blocking layer had a blocking potential that would have to be overcome for the current to flow through the contact. Unfortunately, after much experimentation with such an arrangement, it was found that a thin, aluminum oxide "diode layer" would create carriers between the photoconductive layer and the metallic electrode layer. The creation of these carriers reduces the hold time of the charge on the surface of the photoconductive layer, causes leakage across the diode junction, and requires a complementary output readout. It was found that such a configuration would not hold the charge sufficiently long to enable a readout over a large plate structure surface area. Additionally, the need to read the complementary output would distort the image by receiving large signals that would otherwise be categorized as "noise". This creates some distortion and abnormalities in the final image.

The IBM Technical Disclosure Bulletin, Volume 9, No. 5, of October 1966, pages 555 and 556, discloses a charge-storage beam-addressable memory. This device is a sandwich structure of semi-conductive and insulating materials. This structure is irradiated at selected points or under the influence of applied electric fields to store charges representing data bits. The reading out of the stored bits is accomplished by irradiating the semiconductor at selected points and observing the resultant discharge current. This memory structure has a configuration sequentially organized as follows: electrode, insulator, semiconductor, insulator, and electrode. The semiconductor material used is amorphous selenium. To perform writing, the beam is directed at any selected spot in the semiconductor while the device applies an electric field of selected polarity, representing one or zero, across the electrode layers. The semiconductor becomes locally conductive at the point where it is addressed by the beam, causing localized charges to be built up in the insulating layers at that point under the influence of the applied field. These local charges are trapped, at least for a limited time, when the beam is removed and the semiconductor reverts to its normal state.

The plate structure described in the IBM Technical Disclosure Disclosure Bulletin is a digital memory is a digital memory storage system that looks for polarity output. This would not work effectively where amplitude output and imaging needs were required. In essence, the IBM system is looking for the existence of a signal or looking for the polarity output. As such, the system does not require the use of true insulators. The insulator used in this IBM structure is made of a "defect" material that causes the charge to be trapped within the insulator rather than at the interface of the insulator and the photoconductive layer. In addition, it is difficult to construct the apparatus of the IBM disclosure since the tantalum or niobium oxides used in the insulating layer would interrupt the structure of the selenium. This configuration of materials would cause the selenium to recrystalize and to work less effectively.

In prior-art applications of imaging plates, the photoconductive layers have been responsive to a particular range of light wavelengths. In many instances, the photoconductive material used would have great responsiveness to a particular wavelength of light but have a low charge retention time. In other cases, the photoconductive material used would have a high retention time but would be limited and responsive to only particular light wavelengths. As such, the photoconductive materials used in prior-art imaging plates did not act as ideal photoreceptors. Each of the systems would have limitations when applied to particular systems of readout and particular wavelengths of light reception.

It is an object of the present invention to provide a imaging plate structure that effectively retains the charge while preventing losses due to carriers.

It is another object of the present invention to provide an imaging plate structure that allows for the readout of amplitude output.

It is another object of the present invention to provide an imaging plate that is responsive to a wider range of light wavelengths while providing for high retention times.

It is still a further object of the present invention to provide an imaging plate structure that is suitable for large-area imaging systems.

It is still another object of the present invention to provide an imaging plate structure that is relatively easy to manufacture.

These and other objects and advantages of the present invention will become apparent from a reading of the attached specification and appended claims.

SUMMARY OF THE INVENTION

The present invention is an imaging plate structure that comprises a first conductive layer, a first insulative layer, a photoconductive layer, a second insulative layer, and a second conductive layer. The first insulative layer is integrally affixed to the first conductive layer. This first insulative layer has a thickness suitable for preventing charge tunnelling. This first insulative layer is composed of a true insulator material.

The photoconductive layer is integrally affixed to the first insulative layer opposite the first conductive layer. This photoconductive layer is responsive when the imaging plate structure is exposed to radiation of known energy.

The second insulative layer is integrally affixed to the photoconductive layer opposite the first insulative layer. This second insulative layer has a thickness suitable for preventing charge tunnelling. As with the first insulative layer, the second insulative layer is made of a true insulator material. The second conductive layer is integrally affixed to the side of the second insulative layer opposite the photoconductive layer.

The first conductive layer and the first insulative layer are transmissive with respect to radiation acting on the imaging plate structure. Specifically, the first conductive layer and the first insulative layer will be transparent to electromagnetic radiations, such as ultraviolet or infrared radiation. The first conductive layer is comprised of a conductive organic material or a metal oxide material. The first insulative layer is selected from the group of materials consisting of silicon oxides, aluminum oxides, and carbon/hydrogen-based polymers.

The photoconductive layer may be selected from the group consisting of selenium, lead selenide, doped polymers, mercury cadmium telluride, cadmium telluride, cadmium sulfide, and the like.

In the preferred embodiment of the present invention, there is a single photoconductive layer residing between the first insulative layer and the second insulative layer. However, in an alternative embodiment of the present invention, there are two photoconductive layers. A first photoconductive layer is integrally affixed to the side of the first insulative layer opposite the first conductive layer. A second photoconductive layer is integrally affixed to the side of the first photoconductive layer opposite the first insulative layer. The first photoconductive layer has a longer charge retention time than the second photoconductive layer. In this embodiment, the second photoconductive layer is more responsive to radiation to which the imaging plate structure is exposed. Specifically, the second photoconductive layer is comprised of lead selenide material. The first photoconductive layer could be a polyvinylcarbozole material. In this embodiment of the present invention, an ideal photoreceptor arrangment is configured. The second photoconductive layer is made of a more radiation responsive material. The first photoconductive layer is arranged so as to enhance the readout capabilities of this imaging plate structure. By having a longer retention time, there is less charge migration and more stability for readout.

Another alternative embodiment of the present invention incorporates a third photoconductive layer integrally affixed between the second photoconductive layer and the second insulative layer. This third photoconductive layer has a higher charge retention time than the second photoconductive layer. In this arrangement, both the first and second conductive layers are transmissive with respect to the radiation to which the imaging plate structure is exposed. This configuration allows the imaging to take place on either side of a plate structure. Alternatively, this configuration allows exposure on one side of the plate structure and readout from the other side of the plate structure. This configuration further enhances the capability of the present plate structure by making the configuration an ideal photoreceptor.

Although it is preferable to have the higher charge retention time photoconductive layer at the interface of the insulative layers, it is also possible to configure the photoconductive layers so that each is responsive to a different band of light wavelengths. Since charge will migrate through the photoconductive layers to the insulators/photoconductor interface, improved responsiveness of the imaging plate to a wider range of light wavelengths becomes possible.

There are first and second electrical connections electrically connected to the first conductive layer and the second conductive layer. These electrical connections allow the plate structure of the present invention to be properly readout by attached apparatus.

The method of the present invention involves sensitizing the imaging structure by providing a uniform high electrical field across the conductive layers. With the imaging structure to sensitized, and the DC voltage source remaining connected to the conductive layers, the radiation imaging source is operated to expose the device to a radiation image. The radiation is absorbed by the photoconductive layer causing the conductivity of absorbing areas to increase and allowing the charges at the outer surface of the photoconductive layer to move to the interface between the insulative layers and the photoconductive layer. This establishes an electrostatic charge image at that interface. The DC voltage level and the total exposure to radiation at any given area of the photoconductive layer will determine the amount of the charges that are moved through the photoconductive layer so that there is, in effect, a time integration of the radiation energy received by the photoconductive layer. After the electrostatic image is established, it is readout by connecting the DC voltage source in series with readout electronics. Scanning radiation is progressively directed to the areas of the layer in timed relationship to the operation of the readout electronics. In this manner, a point by point readout in the form of electrical signals is obtained for the electrostatic image that was formed. Various methods of readout exist in the prior art.

DETAILED DESCRIPTION OF THE INVENTION

Figure 1:
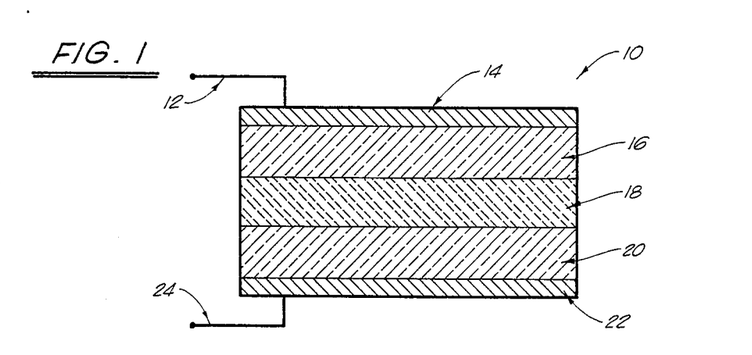
FIG. 1 is a greatly enlarged cross-sectional view of one embodiment of the imaging plate structure taught by the present invention.

Referring to FIG. 1, imaging plate structure 10 has a first electrode 12 conductively connected to a first conductive layer 14. A true first insulative layer 16 is integrally affixed to the first conductive layer 14. Insulative layer 16 has a thickness suitable for preventing charge tunnelling. Photoconductive layer 18 is integrally affixed to the side of the first insulative layer 16 opposite the first conductive layer 14. This photoconductive layer 18 is responsive when the imaging plate structure 10 is exposed to radiation of known energy. A second true insulative layer 20 is integrally affixed to the photoconductive layer 18 opposite the first insulative layer 16. This second insulative layer 20 has a thickness suitable for preventing charge tunnelling. A second conductive layer 22 is integrally affixed to the side of second insulative layer 20 opposite the photoconductive layer 18. A second electrode 24 is conductively connected to the second conductive layer 22.

In the preferred embodiment of the present invention, first conductive layer 14 and first insulative layer 16 are transmissive with respect to radiation acting on the imaging plate structure. In particular, layers 14 and 16 are transparent to electromagnetic radiation. These layers may be made by vapor deposition or by adhesively bonding the individual components together.

The conductive layers 14 and 22 can be made of any metal or alloys with high electrical conductivity such as gold, silver, aluminum, copper, chromium, titanium, platinum, and the like. Other materials such as transparent indium-tin oxide with lower electrical conductivity may be used. Still further, and alternatively, the transparent conductor 14 may be Nesa glass, a thin film of metal deposited directly on the insulative layer 16, or a plastic film with a conductive coating, such as gold-covered MYLAR TM or indium-tin oxide coated. Still further, and alternatively, the conductive layers 14 and 22 can be composed of an organic complex. These organic complexes can include nitro, cyano, halogen, and quinone compounds. The range of resistivities can be from $1\times10^{+16}$ to $1\times10^{-1}$ ohm-cm. Specific examples of such organic complexes which can be used for the conductive layer include polyphenothiazine with a methyl group; poly-3, 6-carbazole with methyl and methoxy groups, iodine, NO located on the 9 position; and poly-3, 5-indole with the same additions as the previous carbazole arrangement.

It is important in the present invention that insulator layers 16 and 20 be "true" insulators. A true insulator is one that will not conduct in electric fields of the particular application. Only "true" insulators will keep the charges trapped within the photoconductive layer 18 during the exposure to known radiation. These true insulators would include oxides such as $SiO_x$, $SiO_2$, $Al_2O_3$, SiN. Additionally, certain organic, carbon-hydrogen based insulators may be used. These carbon-hydrogen based insulators are polymers having no heteroatoms, no pi bondings, and no overlap of orbitals for conduction (as available with charge transfer complexes). In insulators, the valence band is full, the conduction band empty, and no motion of charge results from the application of electric field. Certain types of chain aromatic polymers may be used as the organic insulators for layers 16 and 20. Specifically, these chain aromatic polymers could include polytetrafluoethylene, polyfluorene, polyanthracene, and polyindene. Certain types of vinyl polymers may be used as the insulative layers 16 and 20. These vinyl polymers may include polyvinyl halides, polyvinyl monomers (fluorene, anthracene, and naphthalene); polyvinyl benzene (polystyrene); polyvinyl xylene; and polyvinyl biphenyl. In addition, a very poor conductor such as polyvinyl carbazole may be used for the insulative layers 16 and 20.

Photoconductive layer 18 is, importantly, positioned between the adjacent insulative layers 16 and 20. It is an important aspect of the present invention that the photoconductive layer 18 be positioned between true insulative layers. It is important for the operation of the photoconductive layer and the associated readout of the imaging plate structure 10 that the insulating layers 16 and 20 have a thickness suitable for preventing charge tunnelling. In the preferred embodiment of the present invention, the insulative layer should have a thickness greater than 100 Angstroms. It is believed that the above-stated materials with a thickness of 10,000 Angstroms will serve the insulative purposes of layers 16 and 20, although thinner layers may be suitable.

The photoconductive layer 18 is made of a material that is chosen because of its responsiveness to the particular sections of the electromagnetic spectrum. Likely candidates for material used in the photoconductive layer 18 include selenium, lead selenide, doped polymers, mercury cadmium telluride, cadmium telluride, and cadmium sulfide.

The photoconductive layer 18 can be comprised of a photoconductive polymer. The first photoconducting polymer, poly-N-vinyl carbazole, was originally reported in 1957. This would be a suitable material for use in the photoconductive layer 18. The following table summarizes certain characteristics of various photocurrents in various unsensitized polymers.

TABLE I

| Polymer | Magnitude of photocurrent $i_{ph}/i_d$ | $\lambda.m\mu$ | $E_{ph}$ eV |
|---|---|---|---|
| Polyethylene |  | $i_{ph}$ at 254, not 365 |  |
| Polyethylene | 10–1000 | $i_{ph}$ mainly at 260 | 0.1 |
| Poly(vinyl chloride) | 10–100; <1 at high humidity | $i_{ph}$ mainly at 260 | 1.9 |
| Poly(vinyl chloride) | 10–100 | $i_{ph}$ mainly at 260 | 1.8–1.9 |
| Polyacenaphthylene | 2; increases with nitration to 100 |  |  |
| Poly [1,3-diphenyl-5-(4-vinylphenyl)-2-pyrazoline] | 30–150 | greatest response at 400–425 |  |
| Poly(vinylidene chloride) (Saran) | 10–1000 | at 254, not at 365 |  |
| Poly-p-phenylene and polyvinylenes | 5–20 |  | 0.1–0.25 |
| Polyvinylene |  |  | 0.2–1.2 |
| Poly-p,p'-diethynylazobenzene | 3–5 | maxima at 330 and 610 m$\mu$ | 1.8 |
| Other polyacelylenes | 3–5 |  |  |
| Poly-N—vinylcarbazole |  | high gain in to 500 m$\mu$ |  |
| polyimidazopyrrolone (BTDA DAB) | 200–300 | 200–1300 ($\lambda$max at 550) | 0.36 |
| Polyimidazopyrrolone (PMDA DAB) | 40–60 | 200–1400 ($\lambda$max at 600) | 0.62 |

$i_{ph}$ = photocurrent;
$i_d$ = dark current;
$E_{ph}$ = activation energy of photocurrent.

Electrostatic imaging techniques have also been studied and have found photoconductivity in the following polymers: polystyrene, polyvinylxylene, poly-1-vinyl-naphthalene, poly-2-vinylnaphthalene, poly-4-vinyl-biphenyl, poly-9-vinylanthracene, poly-3-vinylpyrene, poly-2-vinylquinoline, polyvindene, polyacenaphthylene, poly(3,3'-dimethyl-4,4'-diphenylene), aromatic and teteroaromatic derivatives of polyacrylamide, and polymethacrylamide. With these polymers, the presence of heteroatoms, high electrons, and particularly polyacromatic structures improves the photoresponse.

Additionally, the most promising photoconducting sytems may prove to be those in which small amounts of electron donor or acceptor impurity ("dopants") have been added.

Sensitization of photoconductivity, or "doping," refers to the addition of small amounts of impurities to the host substance and is a technique that can be used to increase the dark conductivity and photoconductivity of the host material in molecular crystals and in organic semiconductors. It is possible to use poly-N-vinylcarbazole and other polymers with aromatic and heterocyclic groups as photoconductors. This photoconductivity can be enhanced by electrode acceptors, such as nitro compounds, cyano compounds, organic acids, carboxylic acid in hydrides, esters, halogen compounds, quinones, keto compounds, and aza compounds. Other polymers with aromatic groups can show photoresponse when doped with the same acceptors. Low-molcular-weight pi donors, structurally simiilar to the polymers, show a photoresponse and enhancement by using the same acceptors, when dispersed in film-forming resn binders. Acceptors such as tetrachlorophthalic anhydride, 2,4,7-trinitro-9-fluorenone, and tetrachloro-p-benzoquinone enhance the effects of photoconductivity on poly-N-vinylcarbazole and its monomer N-vinylcarbazole. This polymer-acceptor interaction greatly increases the photoconductivity of poly-N-vinylcarbazole in the region of the charge-transfer band, but has little effect in the ultraviolet region. Doping by using trace amounts of strong mineral acids gives a strng photoresponse in a polyvinylene films. Additionally, small amounts of crystalline zinc sulfide cause appreciable photoconductivity and polyvinylchloride and in polystyrene after ultraviolet irradiation.

In essence, all of the above-stated materials can be chosen and used as the photoconductive layer 18 of the imaging plate structure 10 of FIG. 1. The specific type of material to use will depend upon the radiation acting upon the plate structure 10, the desired charge retention time, and the desired simplicity of manufacture. Improved manufacturing techniques, reduced manufacturing costs and simplicity of assembly favor the use of the photoconductive polymers as the photoconductive layer 18. The entire structure 10 can be made by depositing successive layers of conductor, insulator, photoconductor, insulator and conductor upon a substrate. Assembly may be accomplished by vapor deposition, sputtering or any other technique useful to deposit even thickness films. The technology of assembling if well developed in the art of semiconductor electronics and glass manufacturing.

Thickness of the photoconductive layer must be selected to maximize the quantum efficiency of the detector. This optimum thickness will be a function of the photoconductor's characteristics, the potential at which the detector is operated and the energy of the photons or other particles to which the plate structure is exposed that act to discharge the photoconductive layer.

In essence, the greater the thickness of the photoconductive layer, the more that the photoconductive layer acts with given energy of exposing radiation and the more electron-hole pairs a given quantity of radiation produces. Conversely, as the photoconductive layer 18 is made thinner, the electric field acting on these electron-hole pairs become stronger (the same potential over less distance).

In contrast with the Electrostatic Imaging Apparatus of U.S. Pat. No. 4,521,808, issued June 4, 1985, to which the present patent owner owns exclusive rights, the present invention offers certain improved characteristics.

After experimentation with the previously recited plate structure, it was found that whenever a photoconductive layer was adjacent to a conducting material, carriers would be generated. As more carriers are created, retention times are diminished and image quality deteriorates. It was determined that, through light beam readout, it was difficult to scan and readout the image before carriers were produced and the charge was no longer retained at the photoconductor/insulator interface.

The subject of U.S. Pat. No. 4,521,808 utilied a diode layer so as to prevent leakage. Since the characteristics of a diode require that the diode layer have a thickness of less than ten angstroms, the diode layer was unable to properly hold the charge for a suitable period of time. In essence, a true insulator with a greater than diode thickness is required to prevent this leakage and to maintain the hold time of the charge at the photoconductor/insulator interface.

It was further found that the inclusion of a "diode" layer required discharge during exposure. This resulted in a complementary output. This technique of reading complementary output resulted in "noise" having a greater-than-expected impact on the final image quality.

The configuration of the preferred embodiment of the present invention eliminates the problem of the diode layer of the aforestated patent. In the present invention, a "true" insulator layer is interposed between the photoconductive layer 18 and the adjacent conducting layers 14 and/or 22. As such, the present invention prevents charge tunnelling, increases hold time, allows charging during exposure, and allows the readout of either complementary or non-complementary output.

Figure 2:
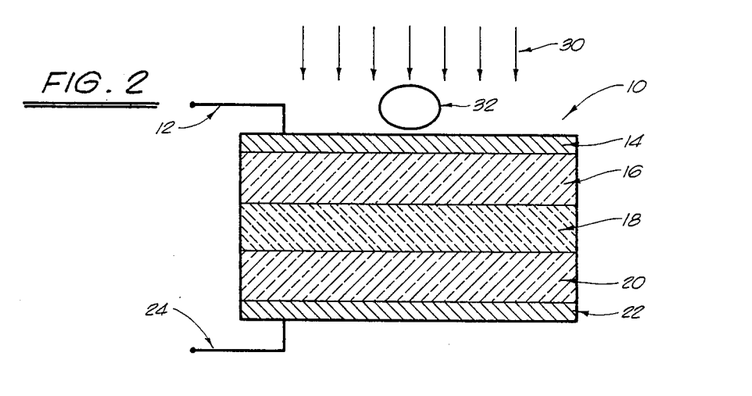
FIG. 2 illustrates the imaging plate structure of the preferred embodiment of the present invention as it is used in an imaging system.

FIG. 2 shows the charged imaging plate 10, illustrated in FIG. 1, being used as an image receptor structure for an x-ray image. Uniform x-ray flux 30 is generated by a convenient source of radiation, such as an X-ray tube, not shown. The detector will operate with any radiation source capable of generating electron whole pairs in the photoconductive layer 18. The uniform photon flux encounters and interacts with object 32, which may be any object of interest. Object 32 is placed over the transmissive conductive layer 14 and adjacent to such transmissive conductive layer 14. For simplicity, object 32 is represented as an oblate spheroid of uniform density.

Figure 3:
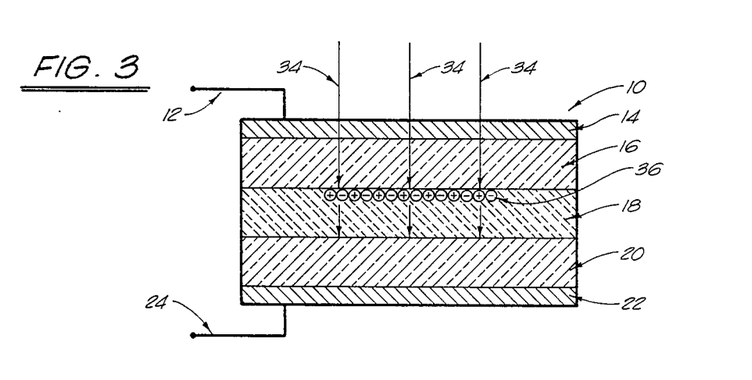
FIG. 3 is greatly enlarged schematic cross-sectional view of the imaging plate structure of FIG. 1 illustrating the effect of modulated radiation flux upon the plate structure.

FIG. 3 shows a greatly enlarged schematic view of a portion of the imaging plate structure 10 of FIG. 2. The modulated radiation flux 34 from the radiation 30 passes through the object 32 and creates electron-hole pairs 36 at the interface of the photoconductive layer 18 and the transmissive insulative layer 16. Since the insulative layer 16 is a true insulator, the electron-hole pairs 36 will be trapped at the photoconductor/insulator interface, as shown in FIG. 3.

Figure 4:
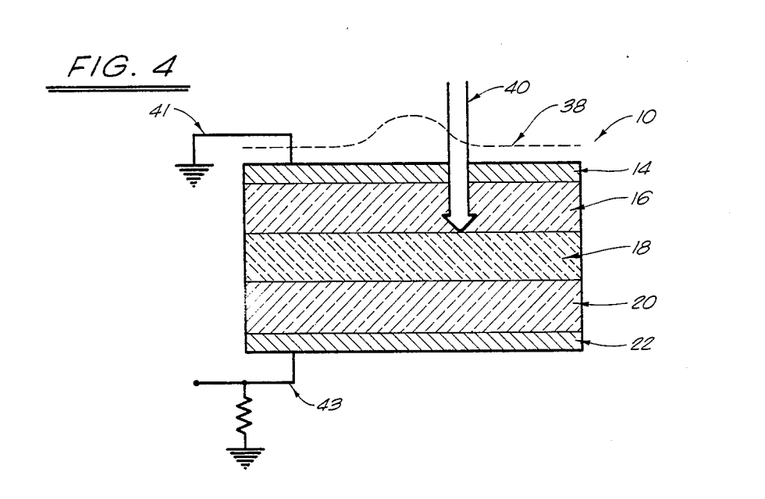
FIG. 4 is a schematic view of the imaging plate structure taught by the present invention being readout by thin scanning photon beam. A schematic representation of the surface charge of the detector is shown.

FIG. 4 shows the imaging plate structure 10 after the radiation exposure has been completed. The plate is now storing a latent image. The modulated surface charge comprising the image is schematically illustrated by humped dotted line 38. This dotted line represents the change in potential created by the electron-hole pairs generated by the radiation exposure. FIG. 4 shows the imaging plate structure having the latent image stored as a modulated surface charge 38. A thin beam of light 40 is shown scanning the surface of the photoconductive layer 18 in a regular rastor pattern. This thin scanning light beam can be produced by a helium-cadmium laser. It should be understood that the photon beam 40 need not be coherent. Photon beam 40 may be of any frequency capable of creating electron-hole pairs in the photoconductive layer 18 of imaging plate structure 10.

Electrode 41 is connected to electrical ground and electrode 43 carries an electrical signal whose wave form is a function of the modulated surface charge 38 in plate 10 as scanned by light beam 40. The analog output from the scanning of the plate structure will be indicative of the voltage variation of the output signal obtained by the beam 40 scanning the latent image. Light beam 40 penetrates the transmissive conductive layer 14 and the transmissive insulative layer 16 to generate electron-hole pairs in the portion of the photoconductive layer 18 irradiated by the beam 40.

Functionally, the imaging and readout of the plate structure 10 is as follows. This method requires that the imaging plate structure 10 be sensitized reponsing to a radiation image to be provided by a radiation source (not shown). The imaging plate structure 10 is sensitized by providing a uniform high electrical field between the conductive layers 14 and 22 at the outer surfaces of the insulative layers 16 and 20. For the imaging plate structure 10, as shown in FIGS. 1–4, this is accomplished by connecting a DC voltage source directly between the first conductive layer 14 and the second conductive layer 22. The polarity of the voltage that is applied may be dictated by the material used in the photoconductive layer 18.

When the imaging plate structure is so sensitized, and the DC voltage source is connected to the imaging plate structure 10, the radiation imaging source is operated to expose the device to a radiation image, the radiation of which is absorbed by the photoconductive layer 18 causing the conductivity of absorbing areas to increase. This allows the charges at the photoconductor/insulator interface, where the radiation is absorbed, to move to the inner surface of the photoconductive layer 18 so as to establish an electrostatic charge image of the radiation image at the photoconductor/insulator interface. The increased conductivites of such areas of the photoconductive layer 18 can be viewed as reducing the effective thickness of the capacitor provided between the two conductive layers 14 and 22. The DC voltage level and the total exposure to radiation at a given area of the photoconductive layer 18 will determine the amount of the charges that are moved through the photoconductive layer. There is, in effect, a time integration of the radiation energy received by the photoconductive layer 18. FIG. 3 shows the final disposition of charges in response to the imaging radiation that is absorbed by the photoconductive layer 18.

After the electrostatic image is established, it is readout by connecting the DC voltage source in series with the readout electronics. As illustrated in FIG. 4, scanning radiation 40 is progressively directed to the areas of the conductive layer 14 in timed relationship to the operation of the readout electronics. The readout electronics receive electrical signals indicative of the charge flow that takes place at the area of the device to which the scanning radiation is directed. In this manner, a point-by-point readout in the form of electrical signals is obtained for the electrostatic image that was formed.

Accordingly, when the scanning radiation is directed to an area where the entire charge for the electrostatic charge image is at the upper surface of the photoconductive layer 18, no electrical signal is produced so long as the voltage provided by the DC voltage source is unchanged. Similarly, when the scanning radiation is directed to an area where no imaging radiation was received by the photoconductive layer 18, the charge that was presented at the outer surface of photoconductive layer 18 is transferred to the upper surface of photoconductive layer 18. Further, since the readout radiation has caused the conductivity of photoconductive layer 18 at such area to increase, thereby reducing the effective thickness of the capacitor provided between the conductive layers 14 and 22, the presence of a uniform DC voltage across the device 10 requires additional charge flow to maintain such voltage. This additional charge flow increases the electrical signal presented to the readout electronics for the area being scanned. The magnitude of the readout signal produced by the scanning process for a given area of the imaging plate structure 10 will, of course, vary inversely with the amount of imaging radiation that was received by the area.

As the laser beam 40 scans the surface of the photoconductive layer 18, it generates electron-hole pairs. These electron-hole pairs are mobile within the photoconductive layer 18 and discharge a portion of the surface charge. In the preferred embodiment of the present invention, the electrons move toward the positively charged surface of the photoconductive layer 18. The voltage drop produced across the resistor connected between the ground connection 41, which is attached to transmissive conductive layer 14, and output electrode 43, while is attached to the conductive layer 22, will be a function of the intensity of the surface charge at the point where the laser beam generates the electron-hole pair.

The laser beam 40 produces a modulated electrical signal at the output electrode 43. The voltage of this output electrical signal will be a function of the surface charge present at the spot where the laser beam strikes the photoconductive layer 18 of the imaging plate structure 10. The current present in the output circuit is a function of the frequency and intensity of the scanning light beam and is a further function of the speed with which the light beam scans the surface of the photoconductive layer 18. A video signal can be electronically processed to produce an image that represents the latent image found in the surface charge of the photoconductive layer of the imaging plate structure 10.

Figure 5:
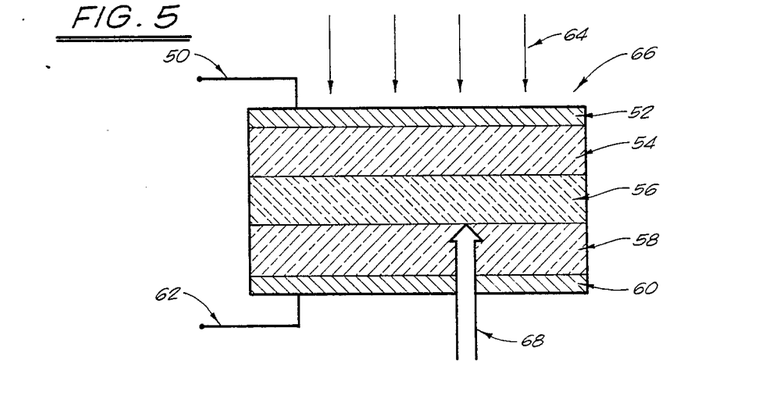
FIG. 5 is a highly enlarged schematic cross-sectional view of an embodiment of the present invention showing readout from the side of the plate structure opposite the side receiving incoming radiation.

FIG. 5 shows an alternative embodiment of the imaging plate structure FIGS. 1-4. In the embodiment shown in FIG. 5, electrode 50 is conductively connected to first conductive layer 52. First conductive layer 52 is integrally affixed to first insulative layer 54. The photoconductive layer 56 is integrally fastened to the side of insulative layer 54 opposite conductive layer 52. Another insulative layer 58 is integrally affixed to the side of photoconductive layer 56 opposite first insulative layer 54. A second conductive layer 60 is integrally affixed to the side of insulative layer 58 opposite photoconductive layer 56. Another electrode 62 is conductively attached to second conductive layer 60. In this configuration, first conductive layer 52 and first insulative layer 54 are transmissive with respect to the uniform radiation flux 64. This uniform radiation flux 64 may be modulated by an intervening object (not shown). The modulated flux 64 impinges on to the imaging plate structure 66 and, specifically, creates electron-hole pairs in the photoconductive layer 56.

Importantly, the second insulative layer 58 and the second conductive layer 60 are transmissive with respect to the light beam 68. Light beam 68 reads out the back side of the imaging plate structure 66. The readout of the plate structure 66 shown in FIG. 5 is accomplished in the matter described herein previously. The plate structure shown in FIG. 5 is an alternative embodiment in that it shows the capability of readout during the charging process. As soon as the exposure to modulated radiation 64 is completed, certain control electronics cause the beam 68 to scan the surface of the photoconductive layer 56 adjacent insulative layer 58. This scanning will be an irregular raster pattern as described herein previously. This scanning causes the plate structure 66 to produce a signal containing image information.

Figure 6:
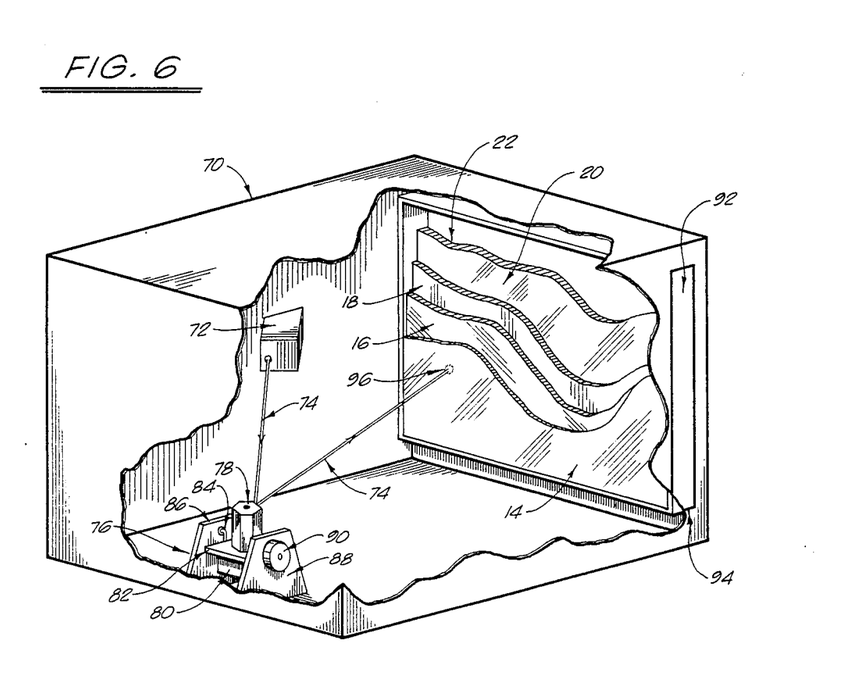
FIG. 6 shows a partially cut-away view of the imaging plate structure and apparatus adapted to practice the preferred embodiment of the present invention.

FIG. 6 shows a partially cut-away view of an apparatus capable of reading out the image whose generation was discussed above. Light-tight housing 70 contains a light source 72 aligned so as to project a light beam 74 under the front of a scanning means 76 which may be a rotating multi-sided mirror. Mirror 76 is mounted on an axis 78 which is operably attached to a scanning motor 80. The mirror axis and scanning motor are affixed to a flat platform 82. This platform is mounted on an axis 84 which is orthogonal to axis 78. Axis 84 is mounted at one end to first upright support 86 and its other end to second upright support 88. The end of axis 84 is swingably mounted in second upright support 88 and is operably attached to stepping motor 90. This scanning means comprising the mirror and associated positioning components is available from Texas Medical Instruments, Inc., One Corporate Drive, Schertz, Texas 78154. Mirror 76 and its associated scanning mechanism is located at one end of housing 70. An imaging plate structure 92 is removably inserted through a light-tight opening 94 into a holder at the other end of housing 70 such that the transmissive conductive layer 14 faces toward the mirror 76.

Light source 72 is preferably a helium-cadmium laser such as a Liconix Model No. 402 laser with an optical modulator. This laser produces a beam of intense light at approximately 4,400 angstroms.

Scanning motor 80 rotates multi-sided mirror 76 on axis 78 to cause light beam 74 to scan horizontally across the surface of imaging plate structure 92. This causes spot 96 to intersect the photoconductive layer as was discussed hereinbefore. Each time spot 96 moves from the left to the right side of imaging plate structure 92, stepping motor 90 moves platform 82 through a sufficient arc to deflect spot 96 vertically one-twentieth (1/20) of a millimeter. This stepping-scanning function may be controlled mechanically or electrically. By convention, spot 96 begins scanning the surface of detector 92 at its upper left hand corner. After raster scanning the entire surface of structure 92, the scanning mechanism may be programmed either to turn off or to rescan the plate.

Figure 7:
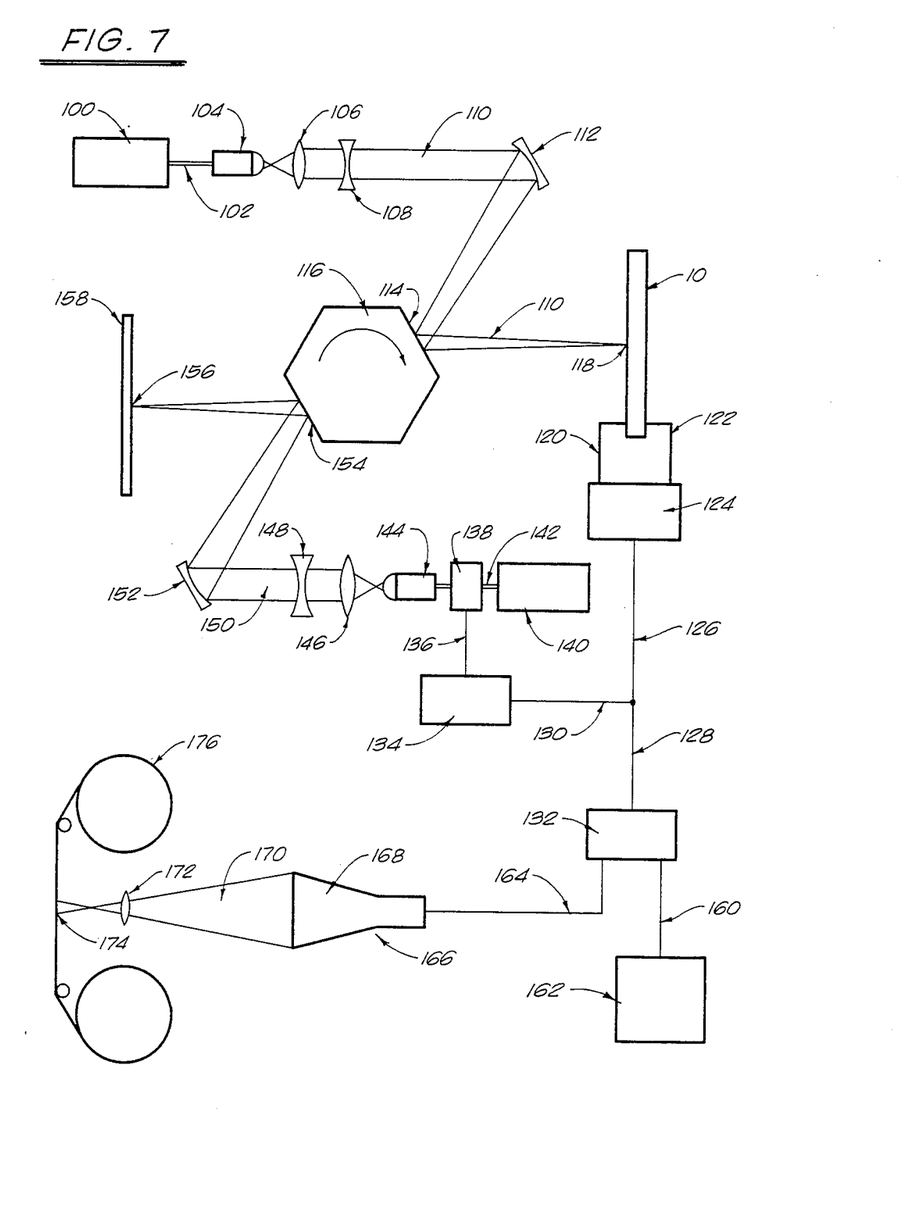
FIG. 7 is a schematic block diagram illustrating an imaging system constructed so as to use the imaging plate structure of the present invention.

FIG. 7 is a block diagram of a radiographic system taught by the present invention. Laser 100 produces a small intense beam of light 102 which is expanded by optical objective 104 and lenses 106 and 108 into a reasonably wide parallel beam 110. Focusing mirror 112 reflects beam 110 on the reflective surface 114 of scanning mechanism 116. Scanning mechanism 116 is substantially the same as the scanning mechanism described in connection with FIG. 6 hereinbefore. The scanning mechanism may be any apparatus capable of moving the laser beam over the imaging plate structure. For example, it may be a set of computer controlled mirrors or holographic optics.

Beam 110 projects a small flying spot 118 onto the surface of the imaging plate structure 10. Imaging plate structure 10 was described in detail in connection with FIGS. 1-4 hereinbefore. Imaging plate structure 10 is electrically connected by lines 120 and 122 to a cooled amplifier 124. Amplifier 125 may be a low-noise amplifier. Amplifier 124 is connected by line 126 to lines 128 and 130 which electrically connect the output of cooled amplifier 124 to signal processor 132 and second signal processor 134, respectively. Signal processor 134 is connected by line 136 to beam modulator 138. Laser 140 produces an intense beam of coherent light 142 which is modulated by beam modulator 138 and spread by optical objective 144 in lenses 146 and 148 to coherent modulated beam 150. Modulated beam 150 is focused by focusing mirror 152 onto a second mirror surface 154 of optical scanner 116. The surface may be another surface of the same sensor or may be separate scanning system.

Mechanical movement of scanning system 116 causes beam 150 to form flying spot 156 which scans the surface of recording medium 158. This process allows the very low intensity latent image on the imaging plate structure 10 to be electrically amplified by cooled amplifier 124 and signal processor 134 and then to be rewritten as an intensified image on a photographic or xerographic plate 158.

The electrical output of cooled amplifier 124 is also fed to signal processor 132 by lines 126 and 128. The output of signal processor 132 is conncted by line 160 to a digital computer 162. Computer 162 is used to digitally stored and manipulate the information imparted to it by the electrical signal produced by cooled amplifier 124 by the way of signal processor 132. The images may be stored on magnetic tape or disk files and can be manipulated within the computer by algorithms for image edge enhancement or pattern recognition for automated diagnosis. The output of signal processor 132 also goes by line 164 to mass storage system 166.

Mass storage system 166 contains a high resolution display tube 168 which produces an analog image 170 which is focused by focusing optics 172 onto a film plane 174 of a mass film storage system 176. This mass film storage system may be a 35 or 70 mm cassette system.

The type of radiographic image processing and storing system described in connection with FIG. 7 is especially useful for interfacing mass radiographic data acquisition equipment with the central computing facilities of a large hospital or diagnostic complex. Digital storage of the radiographic images allow the data to be accessed by a remote radiologist with speed and precision. Computer-based pattern recognition algorithms allow inexpensive gross screening of large patient populations for a radiographic anomolies. The system's ability to rewrite information obtained at very low radiation dosages onto conventional xeroradiographic plates or films permits the system to protect the patient while interfacing with presently existing radiographic data storage formats.

Figure 8:
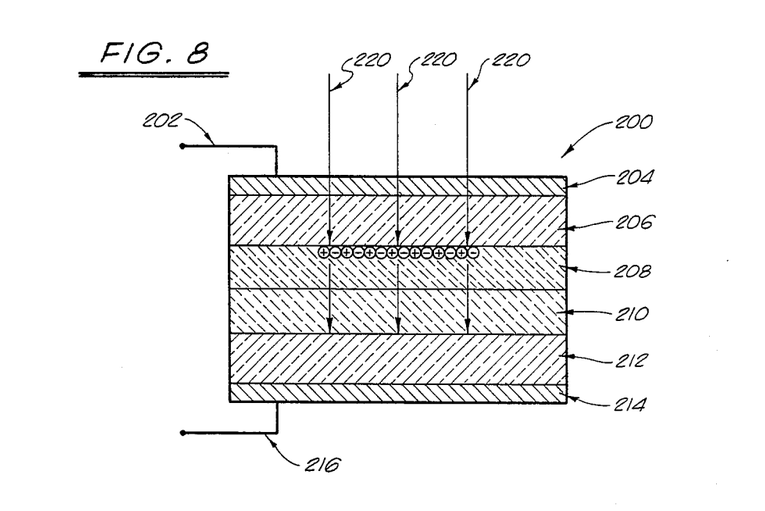
FIG. 8 is a greatly enlarged cross-sectional view of an alternative embodiment of the imaging plate structure of the present invention illustrating the effect of a modulated radiation flux upon the plate structure.

FIG. 8 shows an alternative embodiment 200 of the imaging plate structure of the present invention. Imaging plate 200 has a first electrode 202 conductively connected to a first conductive layer 204. A first insulative layer 206 is integrally affixed to first conductive layer 204. A first photoconductive layer 208 is integrally affixed to the side of first insulative layer 206 opposite first conductive layer 204. A second photoconductive layer 210 is integrally affixed to the side of first photoconductive layer 208 opposite first insulative layer 206. A second insulative layer 212 is affixed to the side of second photoconductive layer 210 opposite first photoconductive layer 208. A second conductive layer 214 is integrally affixed to the side of second insulative layer 212 opposite second photoconductive layer 210. A second electrode 216 is conductively connected to second conductive layer 214. The configuration of the first conductive layer 204, the first insulative layer 206, the second insulative layer 212, and the second conductive layer 214 are similar to those described herein previously. The important feature of the present invention is the inclusion of two side-by-side photoconductive layers. The inclusion of these two side-by-side photoconductive layers 208 and 210 enhances the effects of plate structure 200 as an ideal photoreceptor.

As discussed herein previously, various types of photoconductive material have different qualities. Certain photoconductors are responsive to different wavelengths. Certain types of photoconductors will stop absorbing radiation at the band edge. Still other types of photoconductors will have great response and wide ranging response to certain types of radiation, but will have low retention times. A low charge retention time will make readout difficult and cause the image to deteriorate before an effective image can be readout from the plate structure.

In the configuration shown in FIG. 8, the first conductive layer 204, the first insulative layer 206, and the first photoconductive layer 208 are transmissive with respect to the incoming modulated radiation 220. When the plate structure 200 is exposed to the incoming radiation 200, the second photoconductive layer 210 will respond and produce electron-hole pairs in relation to the modulated incoming radiation flux. These charges will migrate through second photoconductive layer 210, into first photoconductive layer 208 and will reside at the interface of first photoconductive layer 208 and first insulative layer 206. Since the first insulative layer 206 is a "true" insulator, the charges will be retained at that interface and will not leak through. Once the charges are trapped at the photoconductor/insulator interface, the latent electrostatic image could be read only by light beam 222. The readout in this manner will be in the same fashion as described hereinbefore in connection with the preferred embodiment of the present invention.

It is important that the photoconductive layers 208 and 210 have different characteristics. The second photoconductive layer 210 may be of a material classified as a "low-retention time" photoconductor. This is a type of photoconductive material that is responsive to wide ranging wavelengths and generates electron-hole pairs. For example, lead selenide is a particularly good photoconductor for the reception of X-rays. When X-rays impinge upon a lead selenide photoconductor, the material will respond well and generate carriers. Unfortunately, lead selenide has a poor retention time. As soon as the exposure to the incoming X-ray radiation is finished, the charges will migrate from the insulator/photoconductor interface and will be difficult to readout.

Figure 9:
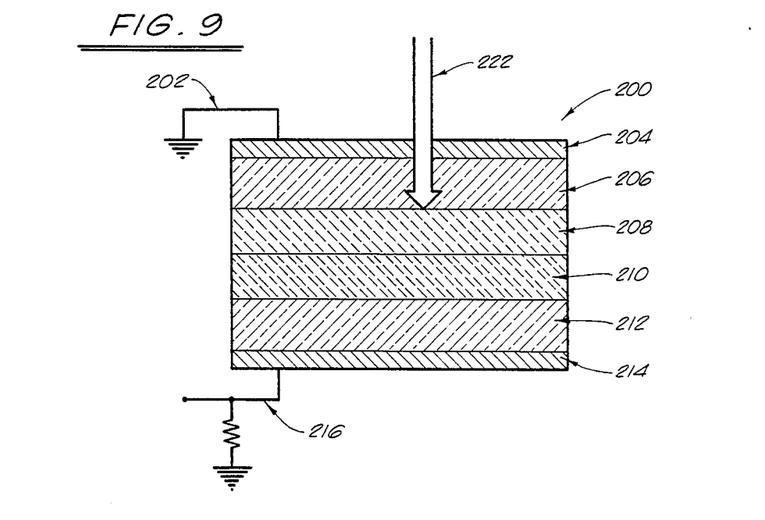
FIG. 9 is a greatly enlarged cross-sectional view of the alternative embodiment of FIG. 8 showing photon beam readout of the imaging plate structure.

Importantly, the present invention overcomes this disadvantage of having a responsive, but low retention time photoconductor. In the embodiment shown in FIGS. 8 and 9, the first photoconductor 208 is a high retention time photoconductor. This high retention time photoconductor may be one that is not necessarily responsive to the incoming radiation flux 220. All that is necessary is that the first photoconductive layer 208 be transmissive with respect to the incoming radiation 220. For example, polycarbazole, and other photoconductive polymers, are of a character that exhibits high retention times for charges but have a small bandwidth response. By placing a polycarbazole photoconductive layer adjacent the lead selenide layer 210, an ideal photoreceptor is produced. As illustrated in FIG. 8, after the carriers have been generated by the low retention time photoconductor 210, these carriers will migrate into the first photoconductive layer 208 and will reside, in a high retention time photoconductor, at the insulator/photoconductor interface. As a result, the image that will normally be lost because of the low retention time of the second photoconductive layer will be saved and retained for a longer periods of time in the first photoconductive layer. As illustrated in FIG. 9, the electrostatic charge pattern can be read out at the interface of the first insulative layer 206 and the first photoconductive layer 208.

It is believed that other photoconductive materials can be substituted and included within the configuration of the plate structure 200 so as to make it an ideal photoreceptor for infrared. If a photoconductive material, responsive to the infrared band width, is used as the second photoconductive layer 210, then this image can be read out by utilizing a high retention time photoconductor as the first photoconductive layer 208. This is true even if the high retention time photoconductive material is totally unresponsive in the infrared radiation bandwidth.

Figure 10:
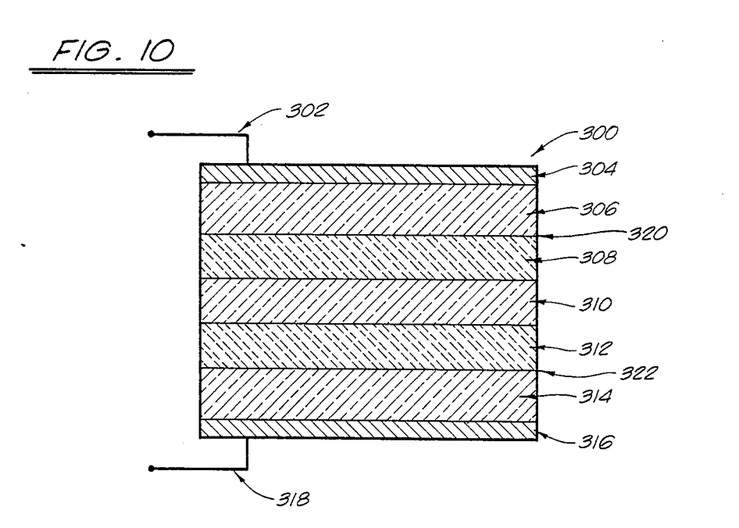
FIG. 10 is a greatly enlarged cross-sectional view of another alternative embodiment of the imaging plate structure of the present invention.

FIG. 10 shows another alternative embodiment 300 of the imaging plate structure of the present invention. As shown in FIG. 10, electrode 302 is conductively connected to first conductive layer 304. First insulative layer 306 is integrally affixed to one side of first conductive layer 304. A first photoconductive layer 308 is integrally affixed to the side of first insulative layer 306 opposite first conductive layer 304. A second photoconductive layer 310 is integrally affixed to the side of first photoconductive layer 308 opposite first insulative layer 306. A third photoconductive layer 312 is integrally affixed to the side of second photoconductive layer 310 opposite first photoconductive layer 308. A second insulative layer 314 is integrally affixed to the side of third photoconductive layer 312 opposite second photoconductive layer 310. A second conductive layer 316 is integrally affixed to the side of second insulative layer 314 opposite third photoconductive layer 312. A second electrode 318 is conductively connected to the second conductive layer 316.

The arrangement and configuration of the embodiment 300 of FIG. 10 is similar to that as described in connection with FIGS. 8 and 9. The important addition is the use of a third photoconductive layer. First photoconductive layer 308 and third photoconductive layer 312 may be of a high-retention time photoconductive material. These photoconductive layers 308 and 312 sandwich second photoconductive layer 310. The second photoconductive layer 310 is of a type having a large bandwidth response and of a quality suitable for producing electron-hole pairs, but having a low retention time. When exposed to modulated radiation, the low retention time second photoconductive layer 310 will produce carriers which will migrate to the insulator/photoconductor interfaces. In the embodiment of FIG. 10, these interfaces will be at 320 between the first insulative layer 306 and the first photoconductive layer 308 and at interface 322 between the third photoconductive layer 312 and the second insulative layer 314. In the configuration of FIG. 10, the first conductive layer 304 and the first insulative layer 306 will be transmissive with respect to the incoming modulated radiation. The second insulative layer 314 and the second conductive layer 316 should be of a quality that will be transmissive with respect to the photon beam readout mechanism.

The embodiment of FIG. 10 allows for the benefits of the embodiment of FIGS. 8 and 9. Plate structure 300 allows for readout during charging and readout from the back of the plate structure.

It should be noted that it is not critical that there be just three photoconductive layers or that the outer photoconductive layers have a higher retention time than the inner photoconductive layers. A plate structure can be configured in which each of the photoconductive layers is responsive to different, but overlapping radiation bandwidths. This can be seen from Table I, herein, the various polymeric photoconductors have responsiveness to different wavelengths. If it is desired to create an ideal photoreceptor in which the imaging plate structure is designed for receiving wide ranging bandwidths, it may be more practical to insert three different types of photoconductive material as the layers 308, 310, and 312. This can be done regardless of the charge retention time of the photoconductive material. Since the charges will always migrate to the insulator/photoconductor interfaces, the doubling or tripling of the photoconductive layer (in terms of materials) will enhance the reception effects of the imaging plate itself. Even if the photoconductive layer at the interface is only responsive to narrow bandwidths, the charge migration will produce a charge image at the interface which is the sum of the reception effects of the various photoconductive layers incorporated into the plate structure. In this manner, it will be possible to produce images of infrared/visible light, and ultraviolet spectrums. The type of image produced by the plate structure will be a result of the photoconductive materials used and the radiation to which the imaging plate structure is exposed.

The present invention, and its embodiments represents a significant improvement over prior art imaging plate structures. By sandwiching the photoconductive layer (or layers) between true insulators, there can be little or no migration of the charges away from the photoconductors/insulators interface. This allows for a longer charge retention times and provides greater capabilities for readout. The present invention allows for charging during the exposure to modulated radiation. There is no need or requirement for discharge during exposure. Additionally, the present invention does not require the reading of complementary output. As a result, there are fewer problems created by "noise" in the system. The assembly and manufacture of the plate structure using known photoconductive polymers greatly facilitates the manufacture of these plate structures. It is quite difficult to work with and vapor deposit metal structures upon metal structures. Polymers, on the other hand, are relatively easy to apply and can be properly assembled by less complex spraying technology.

The example and suggested systems illustrated and discussed in this specification are intended only to teach those skilled in the art the best way known to the inventors to make and use their invention. Nothing in this specification should be considered as limiting the scope of the present invention. Many changes could be made by those skilled in the art to produce equivalent systems without departing from the invention. The present invention should only be limited by the following claims and their legal equivalents.

We claim:

1. An imaging plate structure comprising:
   a first conductive layer;
   a first insulative layer integrally affixed to said first conductive layer, said first insulative layer having a thickness suitable for preventing charge tunnelling therethrough, said first insulative layer being of true insulator material;
   photoconductive layer means integrally affixed to the side of said first insulative layer opposite said first conductive layer, said photoconductive layer means being responsive when said imaging plate structure is exposed to radiation of known energies;
   a second insulative layer integrally affixed to the side of said photoconductive layer means opposite said first insulative layer, said second insulative layer having a thickness suitable for preventing charge tunnelling therethrough, said second insulative layer being of a true insulator material; and
   a second conductive layer integrally affixed to the side of said second insulative layer opposite said photoconductive layer means.

2. The structure of claim 1, said first conductive layer and said first insulative layer being transmissive with respect to the radiation acting on said imaging plate structure.

3. The structure of claim 2, said first conductive layer and said first insulative layer being transparent to light.

4. The structure of claim 1, said first conductor layer being comprised of a metal oxide material.

5. The structure of claim 1, said first conductive layer being comprised of a conducting organic material.

6. The structure of claim 2, said first insulative layer selected from the group of materials consisting of: silicon oxides, aluminum oxides, and carbon/hydrogen based polymers.

7. The structure of claim 1, said photoconductive layer means comprising:
   a first photoconductive layer integrally affixed to the side of said first insulative layer opposite said first conductive layer; and
   a second photoconductive layer integrally affixed to the side of said first photoconductive layer opposite said first insulative layer, said first photoconductive layer having a longer charge retention time than said second photoconductive layer.

8. The structure of claim 7, said second photoconductive layer being more responsive to the radiation to which the imaging plate structure is exposed than said first photoconductive layer.

9. The structure of claim 8, said second photoconductive layer being lead selenide material, said first photoconductive layer being of a polycarbazole material.

10. The structure of claim 8, said first photoconductive layer being transmissive with respect to the radiation to which the imaging plate structure is exposed.

11. The structure of claim 7, and photoconductive layer means comprising:
    a third photoconductive layer integrally affixed between said second photoconductive layer and said second insulative layer, said third photoconductive layer having a higher charge retention time than said second photoconductive layer.

12. The structure of claim 11, said first and second conductive layers being transmissive with respect to the radiation to which the imaging plate structure is exposed.

13. The structure of claim 1, said second insulative layer having a thickness greater than 100 angstroms.

14. The structure of claim 1, said second conductive layer being transmissive with respect to the radiation acting on said imaging plate structure.

15. An imaging plate structure comprising:
    a first conductive layer;
    a first insulative layer generally affixed to said first conductive layer, said first insulative layer having a thickness suitable for preventing charge tunnelling;
    a first photoconductive layer integrally affixed to the side of said first insulative layer opposite said first conductive layer;
    a second photoconductive layer integrally affixed to the side of said first photoconductive layer opposite said first insulative layer, said first photoconductive layer having a longer charge retention time than said second photoconductive layer;
    a second insulative layer integrally affixed to the side of said second photoconductive layer opposite said first photoconductive layer, said second insulative layer having a thickness suitable for preventing charge tunnelling; and
    a second conductive layer integrally affixed to the side of said insulative layer opposite said second photoconductive layer.

16. The structure of claim 15, said first conductive layer, said first insulative layer, and said first photoconductive layer being transmissive with respect to the radiation acting on said imaging plate structure.

17. The structure of claim 16, said first conductive layer and said first insulative layer being transparent to light.

18. The structure of claim 15, said first and second conductive layers being responsive to different wavelengths of light.

19. The structure of claim 15, said first and second insulative layers having a thickness greater than 100 angstroms.

20. The structure of claim 19, said first and second insulative layers being comprised of a true insulating material.

21. An imaging plate structure comprising:
    a first conductive layer;
    a first insulative layer integrally affixed to said first conductive layer, said first insulative layer having a thickness suitable for preventing charge tunnelling;
    a first photoconductive layer integrally affixed to the side of said first insulative layer opposite said first conductive layer;
    a second photoconductive layer integrally affixed to the side of said first photoconductive layer opposite said first insulative layer, said first photoconductive layer having a longer charge retention time than said second photoconductive layer;

a third photoconductive layer integrally affixed to the side of said second photoconductive layer opposite said first photoconductive layer, said third photoconductive layer having a longer charge retention time than said second photoconductive layer;

a second insulative layer integrally affixed to the side of said second photoconductive layer opposite said first photoconductive layer, said second insulative layer having a thickness suitable for preventing charge tunnelling; and a second conductive layer integrally affixed to the side of said insulative layer opposite said second photoconductive layer.

22. The structure of claim 21, said first conductive layer, said first insulative layer, said second insulative layer and said second conductive layer being transmissive with respect to the radiation to which the imaging plate structure is exposed.

23. The structure of claim 21, said first and third photoconductive layers being responsive to different wavelengths of light than said second photoconductive layer.

24. The structure of claim 21, further comprising:
first and second electrical connection means electrically connected to said first conductive layer and said second conductive layer.

* * * * *